(12) United States Patent
Maurer et al.

(10) Patent No.: US 7,073,748 B2
(45) Date of Patent: Jul. 11, 2006

(54) UAV COMPRISING A SENSING SYSTEM FOR DETECTION AND IDENTIFICATION OF BIOLOGICAL PARTICLES

(75) Inventors: Scott M. Maurer, Haymarket, VA (US); Ryan C. Brewer, Bristow, VA (US); Larry D. Jackson, Manassas, VA (US); Kevin J. Kofler, Bristow, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/891,812

(22) Filed: Jul. 15, 2004

(65) Prior Publication Data

US 2006/0011776 A1    Jan. 19, 2006

(51) Int. Cl.
*B64C 39/02* (2006.01)

(52) U.S. Cl. .................. 244/1 R; 701/3; 209/143; 422/50

(58) Field of Classification Search ............... 244/1 R, 244/129.1; 209/143; 95/31; 55/462; 436/100, 436/501, 172, 526, 518; 701/3; 422/50, 422/67, 68.1, 55

See application file for complete search history.

(56) References Cited

U.S. PATENT DOCUMENTS

| 4,651,010 A * | 3/1987 | Javan ................. 250/458.1 |
| 6,692,696 B1 * | 2/2004 | Alberte ..................... 422/50 |
| 6,868,314 B1 * | 3/2005 | Frink ......................... 701/3 |
| 2004/0015336 A1 * | 1/2004 | Kulesz et al. .............. 703/11 |
| 2004/0232052 A1 * | 11/2004 | Call et al. ................ 209/143 |

* cited by examiner

*Primary Examiner*—Galen Barfoot
(74) *Attorney, Agent, or Firm*—DeMont & Breyer, LLC

(57) ABSTRACT

The illustrative embodiment of the present invention is a unmanned aerial vehicle that includes a sensing system for the detection and limited identification of biological agents. The system is small, light weight, requires little power to operate and uses few consumables. The system incorporates elements that enable it to obtain an air sample, extract particulates from the air sample and retain them on a stationary-phase collection media, exposes the particulates to electromagnetic radiation, and monitor the particulates for fluorescent emissions. To the extent that fluorescent emissions are detected and exceed a predetermined value, an alarm is triggered. In some embodiments, in addition to performing real-time analyses on the extracted particulates, the collection media is removed from the system and the sample is subjected to more detailed analysis via additional equipment. Various sample-collecting regions on the collection media are "time stamped" or "location stamped" so that it can determined when and/or where each sample that is being analyzed "off-line" was obtained.

18 Claims, 3 Drawing Sheets

UAV COMPRISING A SENSING SYSTEM FOR DETECTION AND IDENTIFICATION OF BIOLOGICAL PARTICLES

This case is related to co-pending U.S. patent applications Nos. 10/891,644, 10/891,805, 10/891,573, and 10/891,638, which were filed on even date herewith and are incorporated herein by reference.

BACKGROUND OF THE INVENTION

Biological warfare is the intentional use of microorganisms and toxins of microbial, plant or animal origin to produce diseases and/or death in humans, livestock and crops. To terrorists, biological warfare is attractive because bio-weapons have relatively low production cost, it is relatively easy to obtain a wide variety of disease-producing biological agents, bio-weapons are non-detectable by routine security systems, and bio-weapons are easily transportable.

Unlike relatively mature radiation- and chemical-detection technologies, early-warning technology for biological agents is in its infancy. Most known bio-detection systems are "flow-through," wherein individual particles that are contained in a flowing stream (e.g., air, etc.) are interrogated in an optical cell. Interrogation is typically performed using high-power lasers. The flowing stream, and hence the particles, have an extremely low residence time in the optical cell. As a consequence, the laser samples only a portion of the stream, must be relatively high power to provide an appropriate signal-to-noise ratio, and must be operating constantly to ensure detection.

Furthermore, some bio-detection systems use consumables, such as buffered saline solutions, antibodies, assay strips, reagent solutions, cleansing solution and antibodies. Most of these consumables have a specific shelf life, which creates a logistical burden. Furthermore, these consumables are typically unable to withstand demanding thermal requirements in theater. Also, many current bio-detection systems are large, heavy, and consume large amounts of power.

The drawbacks of prior-art bio-detection systems, as described above, limit their usefulness in the field and substantially prevent them from being used in small unmanned aerial vehicles.

SUMMARY

The illustrative embodiment of the present invention is a small, unmanned aerial vehicle ("UAV") that includes a sensing system for the detection and, optionally, identification of biological agents. The sensing system is very small, light weight, requires little power to operate and uses few consumables, which facilitates its use in unmanned aerial vehicles.

The principle of operation for the sensing system is that many biological agents "fluoresce" when excited by radiation that has an appropriate wavelength, which is typically within or near the ultraviolet range. "Fluorescence" is the radiation that is emitted from a biological agent (or other substances) when it is excited as described above. What occurs at a molecular level is that the substance absorbs a photon of electromagnetic radiation, which causes an electron in the substance to move from a low energy state to a higher one. When the electron returns to a lower energy state, a photon is emitted. This photon is fluorescent radiation.

Since many types of biological agents fluoresce under ultraviolet light, the detection of fluorescent emissions from a sample that has been exposed to radiation having a wavelength in or near the ultraviolet range indicates that biological agents might be present. This is the detection function of the sensing system; some embodiments of the sensing system also provide an identification function as well.

Regarding identification, different biological agents contain different fluorescing organic substances (e.g., differing in amount or type). As a consequence, the peak intensity of the fluorescence emissions and/or characteristic fluorescent spectra for these different biological agents will be different. Furthermore, to the extent that different biological agents contain different fluorescing organic substances, the wavelength of the electromagnetic energy that is required to excite fluorescence will vary. Also, a given biological agent will exhibit a different fluorescence response (e.g., intensity, etc.) as a function of the wavelength of the excitation light. These attributes provide a basis for identification of biological agents.

In the illustrative embodiment, at least a portion of the sensing system is disposed in a wing of the UAV and communicates with UAV avionics. In the illustrative embodiment, the sensing system comprises an interrogation cell, which has:

A stationary-phase collection media for extracting particulates, such as biological agents, from an air sample and retaining them. The collection media includes a plurality of sample-collecting regions.

A device or arrangement that is capable of moving the collection media or redirecting the flow of air so that sample-collecting regions are selectively and individually exposed to a flow of air.

A source of electromagnetic radiation for exposing any biological agents that have been retained in the collection media. When exposed to electromagnetic radiation having an appropriate wavelength, the biological agents fluoresce. Wavelengths within a range of about 250 to about 500 nanometers (i.e., ultraviolet light to blue range of wavelengths) are appropriate for causing fluorescence in many biological agents. In the illustrative embodiment, the source of electromagnetic radiation is one or more light-emitting diodes. In some embodiments, the source of electromagnetic radiation is two or more light emitting diodes (LEDs) that have a different peak emission wavelength.

A detector, such as a photodetector, for monitoring fluorescent emissions from any biological agents that are present on the collection media. The detector must be sensitive to the wavelengths of the fluorescent emissions from biological agents of interest. The peak wavelength(s) of fluorescent emissions from biological agents of interest is typically in the range of about 300 to about 600 nanometers. To the extent that fluorescent emissions are detected and exceed a predetermined value, it is indicative that a biological attack might be in progress or might have occurred. Characteristics of the fluorescent emissions (e.g., wavelength, intensity, etc.) can be used to identify a biological agent that has been detected by the system.

In addition to the interrogation cell, the sensing system also includes control, data-acquisition and data-processing circuitry for:

Controlling the operation of the source of electromagnetic radiation.

Controlling the operation of the device that is capable of moving the collection media or redirecting the flow of air.

Controlling the operation of the detector including data acquisition.

Signal processing. A signal generated by the photodetector is processed to:
  detect: determine if a biological agent is present in the air sample;
  quantify: estimate the amount of biological agent present, if any;
  assess: determine if the amount of a biological agent present is indicative of a biological attack or otherwise poses a risk to the health of the local population, livestock, etc.; and
  identify: determine the identity of a biological agent that is detected.

In some embodiments, in addition to performing real-time analyses on the extracted particulates, the collection media is removed from the system and is subjected to more detailed analysis via additional equipment (e.g., pcr, etc.). The various sample-collecting regions on the collection media are "time stamped" or "location stamped" so that it can determined when and/or where each sample that is being analyzed was obtained. In such embodiments, the sensing system includes a device for associating each sample-collecting region that has been exposed to an air sample with at least one of either a time or a location.

DETAILED DESCRIPTION

The illustrative embodiment of the present invention is an unmanned aerial vehicle that includes a sensing system for the detection and, optionally, identification of biological agents. In some embodiments, the sensing system is very light and quite small, fitting in an enclosure that is about 1 inch×1 inch×2 inches. This enables the sensing system to be used in conjunction with mini and even micro UAVs.

Biological agents of interest typically have a size that is in a range of hundreds of nanometers (e.g., for viruses, etc.) to a few microns (e.g., for bacteria, etc). Typical biological agents of interest include, for example, anthrax (1×2 micron), plague (0.5×1 micron), tularemia (0.5×1 micron), and small pox (200×250×250 nanometers). The illustrative embodiment of the present sensing system is capable of detecting particles in this size range. In some variations of the illustrative embodiment, the sensing system is configured to detect smaller biological agents, and in yet some additional variations, the sensing system is configured to detect larger biological agents.

Figure 1:
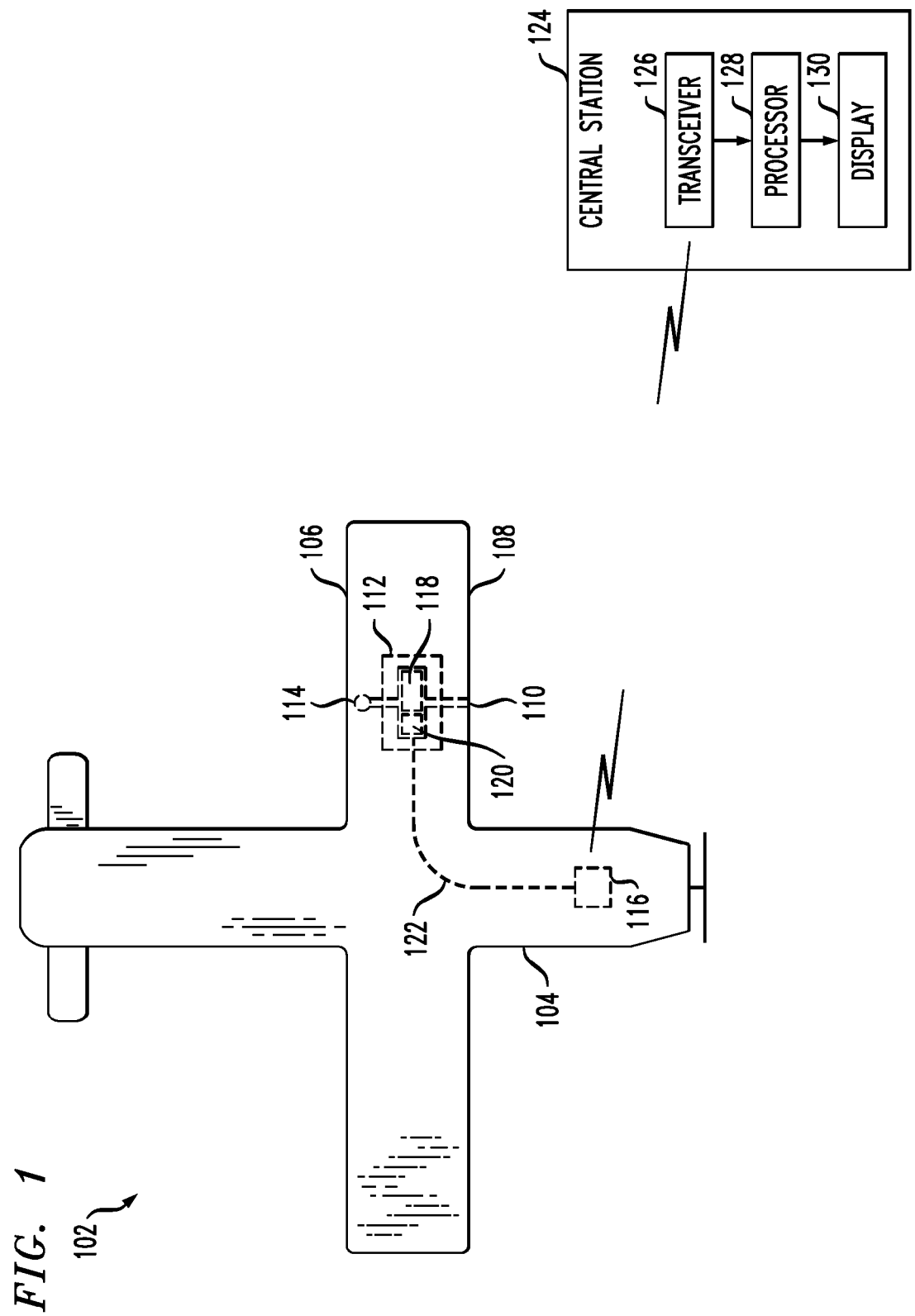
FIG. 1 depicts a UAV comprising a sensing system in accordance with the illustrative embodiment of the present invention.

FIG. 1 depicts a view of UAV 102. In the illustrative embodiment, UAV 102 is quite small. In some embodiments, UAV 102 is an "MAV" (micro aerial vehicle), which is usually defined as an aerial vehicle that measures less than 6 inches in any dimension, yet carries a miniaturized payload, simple avionics and a communication link sufficient for carrying out a mission.

UAV 102 includes a sensing system, at least a portion of which is on-board. The on-board portion of the sensing system includes interrogation cell 118 and control/data acquisition/data processing circuitry 120. In the illustrative embodiment, interrogation cell 118 and control/data acquisition/data processing circuitry 120 is disposed within wing 106 within enclosure 112. In some alternative embodiments, the interrogation cell and control/data acquisition/data processing circuitry is disposed within fuselage 104. In yet some further alternative embodiments, the interrogation cell and control/data acquisition/data processing circuitry is disposed within an external aerodynamic module (not depicted), which is attached to UAV 102. The sensing system also includes central (ground) station 124, which, of course, is physically separate from UAV 102.

Air is directed through intake 110, which is located at leading edge 108 of wing 106, to interrogation cell 118. As described further later in this specification, the air is filtered before it reaches interrogation cell 118.

Particulates (e.g., biological agents, etc.) that are contained in the air are extracted and retained by a solid phase collection media within interrogation cell 118. The particulates are interrogated (e.g., by exposure to electromagnetic radiation, etc.). The interrogation is controlled by control/data acquisition/data processing circuitry 120. After passing through interrogation cell 118, a substantially particulate-free flow of air is expelled from through exhaust 114 at the upper surface of wing 106.

Information that is obtained from interrogation of the retained particulates is relayed to avionics package 116 via wire 122. In some other embodiments, transmission of data to the avionics package is done wirelessly.

Avionics package 116, which typically includes a processor, transceiver and antenna system, relays the information obtained from interrogation to central-station tranceiver/antenna system 126, which, in turn, relays the information to central-station processor 128. After suitable processing, which can be performed exclusively on-board UAV 102 or exclusively at central station 124 (via central-station processor 128) or at both locations, the information obtained from interrogation is displayed on display 130. The manner in which the information is displayed is described in further detail later in this specification.

Figure 2:
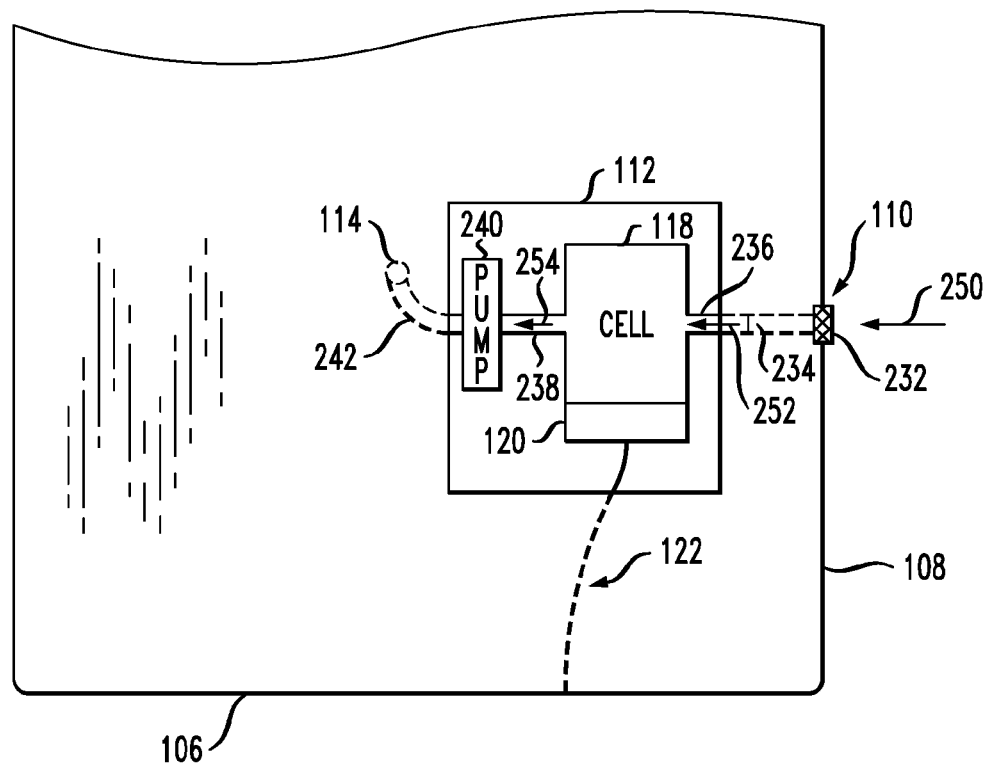
FIG. 2 depicts an under-wing view of a wing of the UAV of FIG. 1.
Figure 3:
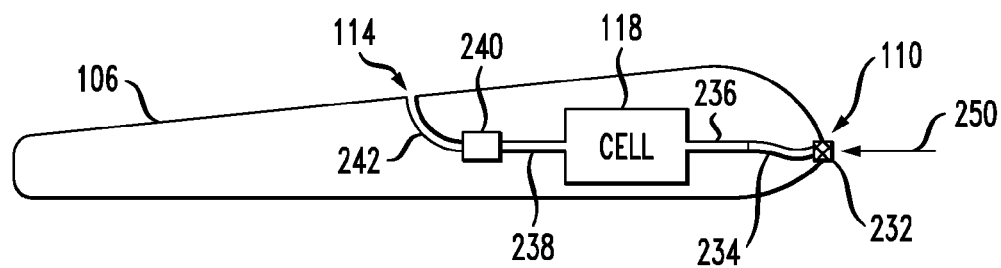
FIG. 3 depicts a side cross-sectional view of the wing of FIG. 2.

FIGS. 2 and 3 depict further detail of the integration of interrogation cell 118 into UAV 102. FIG. 2 is a view from underneath wing 106 through a removed access panel. FIG. 2 depicts interrogation cell 118 and associated elements of the sensing system. FIG. 3 is a side, cross-sectional view of wing 106.

As depicted in FIGS. 2 and 3, interrogation cell 118 is disposed within wing 106 near its leading edge 108. Although the interrogation cell is extremely compact, measuring little more than about 1 inch×1 inch×2 inches in some embodiments, there is, nevertheless, insufficient volume available within the trailing half of wing 106 of micro UAV 102 to house the cell. In larger craft, of course, the interrogation cell can be positioned nearer to the trailing edge of wing 106.

Referring to both FIGS. 2 and 3, filter 232 is disposed at or near air intake 110 at leading edge 108 of wing 106. Filter 232 prevents large particulate matter that is contained in air 250 from entering interrogation cell 118. If large particulates were to enter the interrogation cell, they might clog the cell, thereby shortening run time. In some embodiments, filter 232 filters particulate matter that is larger than about 50 microns. At this size, filter 232 will trap large dust particles, insects, and the like. Since, as described above, most biological agents of interest are much smaller than 50 microns, they will readily pass filter 232 and enter interrogation cell 118.

Filter elements suitable for use in the illustrative embodiment as filter 232 have a 50-micron pore structure and include, without limitation:

| glass micro-fiber | paper | anodized aluminum |
| Teflon ® -based materials | stainless steel | polymers/plastics. |

At least some of these filter elements are available from Donaldson Company of Minneapolis, Minn.; the other elements are available from any of a variety of commercial suppliers.

As an alternative to filter 232, a micro virtual impactor concentrator (micro-VIC®) can be used. The micro-VIC®, which is available from MesoSystems Technology, Inc. of Albuquerque, N. Mex., utilizes inertial effects to discharge and separate larger particulates from relatively smaller biological agents. Another alternative to a filter is a rotating-arm impactor.

Tube 234, which in the illustrative embodiment is teflon® tubing, couples inlet 236 of interrogation cell 118 to intake 110. Tube 234 receives flow 252 of filtered air 252 from filter 232.

Flow 252 enters cell 118 and passes through the solid-phase collection media. As described in more detail below, the collection media is capable of extracting and retaining particulates 460 that are contained in flow 252. Flow 254 of air exits interrogation cell 118 through cell outlet 238. In some embodiments, pump 240 is used to draw air through the interrogation cell (or for other reasons as described later in this specification). In some other embodiments, a ram-air system is used, which relies on the forward velocity of UAV 102 to transport air through interrogation cell 118. See U.S. Pat. No. 6,442,997 "Ram-Air Sample Collection Device for a Chemical Warfare Agent Sensor." The air is conducted from outlet 238/pump 240 via tubing 242 to exhaust 114. As previously described, in the illustrative embodiment, exhaust 114 is disposed on the upper surface of wing 106.

Figure 4:
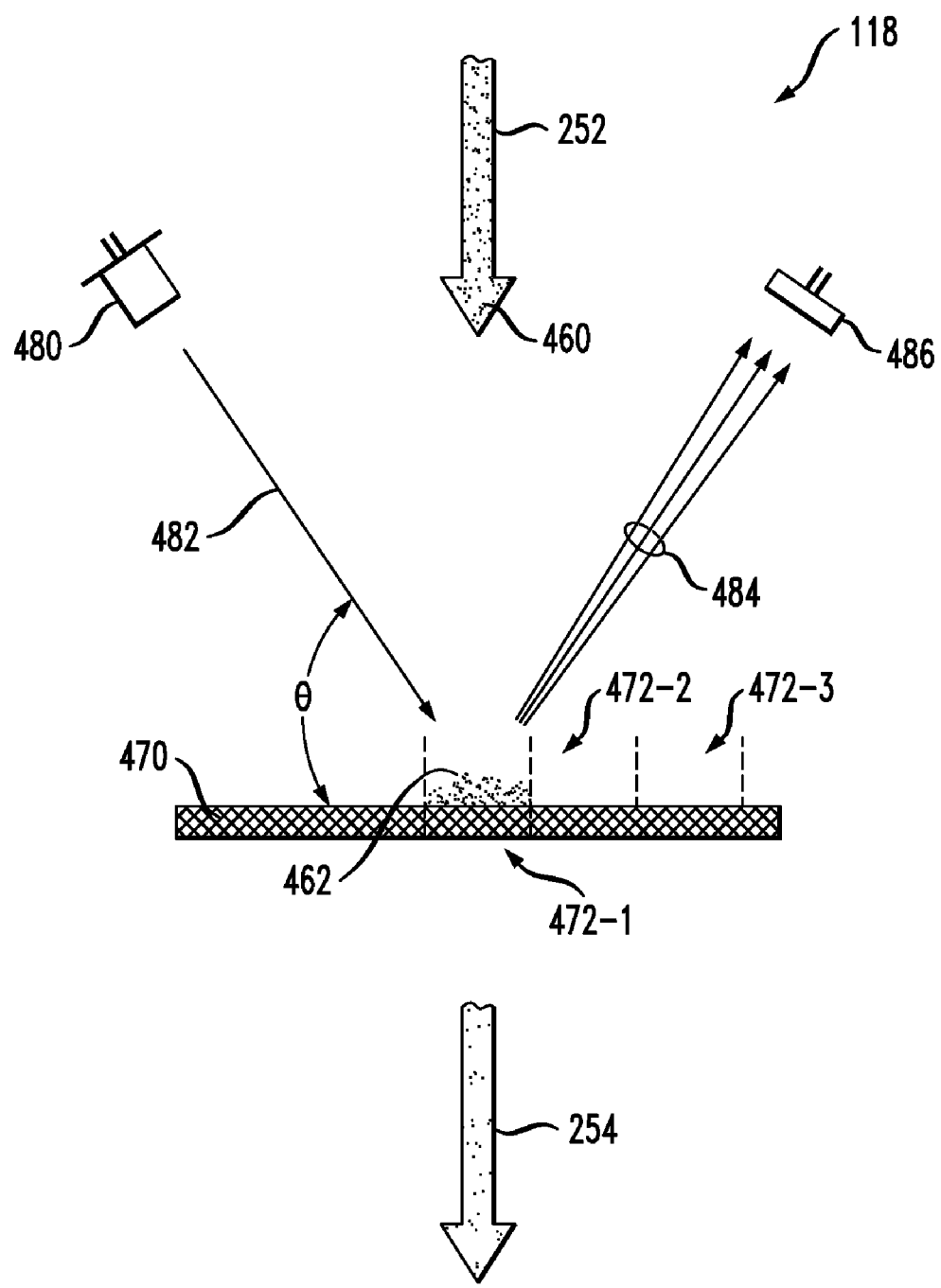
FIG. 4 depicts an illustrative embodiment of an interrogation cell of the sensing system.

FIG. 4 depicts a schematic of the internal arrangement of interrogation cell 118. Flow 252, which contains particulates 460 (i.e., particulates that passed filter 232) enters interrogation cell 118 and passes through sample-collecting region 472-1 of collection media 470. The collection media comprises a plurality of such sample-collecting regions, three of which—472-1, 472-2, and 472-3—are identified in FIG. 4. Interrogation cell 118 is configured so that each sample-collecting region can be exposed to flow 252 of air at different times. As described in more detail later in this specification and in applicants' co-pending U.S. patent application Ser. No. 10/891,805, this selective exposure can be accomplished by either moving (e.g., rotating, etc.) collection media 470 or by redirecting flow 252 of air.

Collection media 470 comprises a stationary phase that is physically adapted to trap at least about 99 percent of particulates 460 that have a size in the range of interest for biological agents (i.e., about 0.3–5 microns). Particulates 460 that are retained by collection media 470 compose particulate sample 462. Interrogation cell 118 can include a stationary-phase collection media having a more definitive rating to the extent the system is intended to monitor a specific type of threat (i.e., a particular biological agent).

Stationary-phase collection media 470 suitable for use in conjunction with the sensing system, as a function of the biological agents of interest, includes:

HEPA/ULPA glass microfiber filtration media that is rated at >99.7% removal efficiency for particulates at 0.3 microns.

PTFE/PFA/PFE (i.e., Teflon®-based) filtration media that is rated at >99% for particulates at 0.3 microns.

Paper filtration media that is rated at >99% for particulates at 0.3 microns.

Stainless Steel filtration media that is rated at >99% for particulates at 1 micron.

Anodized Aluminum filtration media that is rated at >99% for particulates at 1 micron.

Other types of filtration media such as plastics and other polymers that are rated at >99% for particulates at 0.3 microns.

It was mentioned earlier that either a pumped or ram air system can be used to draw air through interrogation cell 118. Even in those embodiments that rely on ram air transport, an appropriately-valved pump is advantageously included in the system and used to periodically reverse the flow of air through collection media 470. Reversing the flow of air removes at least some of the material (i.e., particulates 460) that has been retained by collection media 470. Reversing the flow in this manner might be necessary if the collection media becomes clogged. Alternatively, this technique can be used to establish a new interrogation baseline (e.g., for fluorescent emissions, etc.).

Interrogation cell 118 includes a source of electromagnetic radiation, which in the illustrative embodiment is LED 480. Electromagnetic radiation from LED 480 is directed toward sample 462 on collection media 470 to interrogate the particulates retained by the collection media. If any of the retained particulates are biological agents, they will fluoresce as a consequence of exposure to electromagnetic radiation having an appropriate wavelength. Since most biological agents of interest are excited by wavelengths between about 250 to 500 nanometers (i.e., ultraviolet to blue range of wavelengths), the peak emission wavelength of the excitation source (e.g., LED 480) should be within this range. LEDs emit radiation over a range of wavelengths; the "peak emission wavelength" is the wavelength at which most of the radiation from the LED is emitted.

In some embodiments, LED 480 does not remain on continuously; rather, it is pulsed "on" and "off." The LED is controlled for intermittent operation via control/data acquisition/data processing circuitry 120. In comparison with an "always-on" laser-based system, the use of an LED, especially in a pulsed mode, consumes far less power. For example, average power consumption for a pump-less system is expected to be about 100 mW at 5V. The sensing system is adaptable for battery operation, as desired, at 6, 12 or 24 volts DC.

LED 480 can be positioned at any out-of-plane angle θ relative to collection media 410. The angle θ is typically in the range of 0 to 90 degrees and more typically lies between 45 to 60 degrees.

With continued reference to FIG. 4, interrogation cell 118 includes at least one photodetector 486 for monitoring fluorescent emissions 484 that result from the exposure (of biological agents, etc.) to electromagnetic radiation. In the illustrative embodiment, the photodetector is a photodiode. Photodetector 486 must be sensitive to at least the wavelengths of the fluorescent emissions from biological agents of interest. Most biological agents of interest fluoresce at wavelengths that are within the range of about 300 to about 600 nanometers. For example, tryptophan (an amino acid that is typically found in animal proteins or bacteria) has a peak emission at about 330 nanometers, NADH (usually associated with growth media and yeast grown products that are used for culturing organisms) has a peak at around 450 nanometers and flavins (again associated with growth media) have a peak at around 560 nanometers. As a consequence, photodetector 486 should be sensitive to wavelengths in this range.

Interrogation cell 118 can be arranged to have any one of a variety of configurations, including, without limitation:
- Single LED and single photodetector;
- Single LED and photodetector array or multiple individual photodetectors;
- Multiple LEDs (the same and/or different peak emission wavelength) and single photodetector;
- Multiple LEDs (the same and/or different peak emission wavelength) and photodetector array or multiple individual photodetectors.

These configurations of interrogation cell 106 are described in detail in applicants' co-pending U.S. patent application Ser. No. 10/891,644. Furthermore, interrogation cell 118 can include an LED array that includes at least two LEDs with different peak emission wavelengths, as described in applicants' co-pending U.S. patent applications Ser. Nos. 10/891,573 and 10/891,638.

As previously described, collection media 470 includes a plurality of sample-collecting regions 472-$i$ (i.e., 472-1, 472-2, 472-3). There are a variety of advantages to using multiple sample-collecting regions, including:
- the prevention of excessive particulate build-up, thereby extending run time;
- the ability to conduct off-line, detailed analysis of particulates as a function of collection time or collection location.

As mentioned earlier, and as described more fully in applicants' co-pending U.S. patent application Ser. No. 10/891,805, the sensing system includes a device or arrangement for moving collection media 470 or redirecting flow 252 of air so that sample-collecting regions 472-$i$ are selectively and individually exposed to a flow of air.

The decision to direct flow 252 of air to a given sample-collecting region 472-$i$, or to switch to a different sample-collecting region, can be based on:
- a set time period (e.g., change region every 30 minutes, etc.); and/or
- a command from a sensor that is monitoring the accumulation of particulates within the sample-collecting region; and/or
- the UAV reaching a particular location; and/or
- a command from an operator (e.g., a person that is monitoring the output from the sensing system); and/or
- a random occurrence (e.g., a random time period, etc.).

In some embodiments, an identifying indicium is associated with each sample-collecting region 472-$i$ that has been exposed to flow 252 of air. In some embodiments, the identifying indicium is a time or a time period. In other words, each sample-collecting region 472-$i$ that has received a flow of air is "time" stamped (i.e., a particular sample-collection region is identified as having collected a sample at a certain time or during a certain time period). In some other embodiments, the identifying indicium is a location. In other words, each sample-collecting region 472-$i$ that has received a flow of air is "location" stamped (i.e., a particular sample-collection is identified as having collected a sample when UAV 102 was at a certain location). Time stamping and location stamping is accomplished, in known fashion, using a clock or location-determining device (e.g., GPS, etc.), respectively. This stamping operation is important in embodiments in which collection media 470 is removed from interrogation cell 118 for post analysis.

Photodetector 486 (or photodetector array) generates a signal when it receives fluorescent emissions 484. The signal contains information pertaining to the fluorescent emissions. For example, in some embodiments, the signal is indicative of the wavelength(s) of the fluorescent emissions and the intensity of those emissions. This information can be used, for example, to develop a relative particulate (i.e., biological agent) count as a function of wavelength.

Control/data acquisition/data processing circuitry 120 (FIG. 1) controls much of the operation of interrogation cell 118. In this context, this circuitry, which in some embodiments includes a processor and memory, is capable of:
- driving LED(s) 480; and
- capable of intermittently pulsing LED(s) 480; and
- enabling photodetector(s) 486; and
- capable of moving collection media 470 or redirecting flow 252 of air so that sample-collecting regions 472-$i$ are selectively and individually exposed to a flow of air.

Furthermore, control/data-acquisition/data-processing circuitry 120 receives the signal from the photodetector (representative of the fluorescent emissions) and performs one or more of the following tasks:
- stores a representation of the signal; and/or
- partially processes the signal; and/or
- fully processes the signal; and/or
- transmits to avionics package 116:
  - a representation of the signal; or
  - a representation of the signal as well as data obtained from partially processing the signal; or
  - a representation of the signal as well as data obtained from fully processing the signal; or
  - only the information obtained from processing the signal.

In some embodiments, at least some processing of the signal(s) from photodetector 486 is performed at central station 124. Doing so facilitates using additional, more powerful data-processing algorithms to analyze the information contained in the signals.

The information obtained from the signal(s) from photodetector 486 can be used to:
- detect biological agents;
- estimate the amount of biological agent detected;
- determine if the amount of biological agent present is indicative of a biological attack or otherwise poses a risk to the health of the local population, livestock, etc.;
- identify the biological agents that are detected.

Detection and identification of biological agents is described in further detail in applicants' co-pending patent application Ser. No. 10/891,644 and Ser. No. 10/891,573.

As to detection, the detection of fluorescence, particularly at certain wavelengths, might be indicative of the presence of a biological agent. The intensity of the signal, as well as the air flow through the interrogation cell and the amount of time that the air has been flowing provides information related to the amount of biological agent present in the environment. In other words, it can be used to develop a particulate count as a function of wavelength. As to identification, the wavelength of fluorescent emissions measured by interrogation cell 106 can be compared to the wavelength of fluorescent emissions of known biological agents. Correspondence between the measured emissions and one of the references is indicative of the presence of that biological agent. For further information about identification of biological agents, see applicants co-pending U.S. patent application Ser. No. 10/891,573.

The results of signal processing are presented via a graphical user interface. In some embodiments, the results are displayed as an "intensity" or "particle count" as a function of frequency or wavelength of the fluorescent emissions. In some embodiments, an alarm limit is displayed for each "type" (i.e., each different frequency or wavelength) of biological agent. If an alarm limit is exceeded, an alert (e.g., sound, flashing light, etc.) is provided. The manner in which information that is obtained from interrogation cell 118 is presented via a graphical user interface is described in further detail in applicants' co-pending U.S. patent application Ser. No. 10/891,644.

It is to be understood that the above-described embodiments are merely illustrative of the present invention and that many variations of the above-described embodiments can be devised by those skilled in the art without departing from the scope of the invention. For example, in this Specification, numerous specific details are provided in order provide a thorough description and understanding of the illustrative embodiments of the present invention. Those skilled in the art will recognize, however, that the invention can be practiced without one or more of those details, or with other methods, materials, components, etc. In particular, as appropriate, features that are disclosed in co-pending U.S. patent application Ser. Nos. 10/891,644, 10/891,805, 10/891,573, and 10/891,638 can be used in conjunction with the illustrative embodiment that is depicted and described herein. Those skilled in the art will know how to integrate such features into the illustrative embodiment of the present invention.

In some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

We claim:

1. An apparatus comprising:
   a fuselage;
   a wing, wherein said wing depends from said fuselage;
   an intake for receiving air, wherein said intake comprises an opening in at least one of said wing and said fuselage;
   a sensing system for detecting biological agents, wherein said sensing system is fluidically coupled to said intake, and wherein said sensing system obtains a first sample of particulates, wherein said particulates are contained in the air received by said intake;
   a GPS receiver for determining location; and
   a device for associating location, as determined by said GPS receiver, with said first sample, thereby providing an indication of a sampling location of said first sample.

2. The apparatus of claim 1 wherein said sensor is disposed in said wing.

3. The apparatus of claim 1 wherein said intake comprises an opening in a leading edge of said wing.

4. The apparatus of claim 3 wherein said sensing system is disposed in said wing.

5. The apparatus of claim 1 comprising a filter, wherein said filter overlies said intake.

6. The apparatus of claim 1 comprising circuitry for generating a signal, wherein said signal contains first information relating to said first sample of particulates.

7. The apparatus of claim 6 comprising a transceiver, wherein said transceiver receives second information, which is a sub-set of said first information, and transmits said second information to a ground station.

8. The apparatus of claim 1 wherein said sensing system retains said first sample of particulates.

9. The apparatus of claim 8 wherein said sensing system obtains a second sample of particulates, and wherein said sensing system retains said second sample of particulates.

10. The apparatus of claim 1 comprising a device for associating at least one of either a time or a time period with said first sample.

11. The apparatus of claim 9 wherein said device for associating location with said first sample also associates location with said second sample, thereby providing an indication of a sampling location of said second sample.

12. The apparatus of claim 1 wherein said sensing system comprises:
   collection media, wherein said collection media comprises a plurality of sample-collecting regions;
   means for positioning said sample-collecting regions, at different times, into a sample-collecting position in which they receive a flow of said air containing said particulates;
   a source of electromagnetic radiation for exposing said sample-collecting regions to electromagnetic radiation one at a time; and
   a photodetector for detecting fluorescent emissions from particulates that are retained in said sample-collecting regions and have been exposed to said electromagnetic radiation.

13. The apparatus of claim 12 wherein said device for associating location with said first sample also associates location with each sample-collecting region that has been positioned in said sample-collecting position.

14. The apparatus of claim 12 comprising circuitry for determining an amount of fluorescent emissions having a first wavelength.

15. The apparatus of claim 14 comprising circuitry for triggering an alert when said determined amount of fluorescent emissions at said first wavelength exceed a first value.

16. The apparatus of claim 12 comprising circuitry for intermittently activating said source of electromagnetic radiation to intermittently expose said sample-collecting regions to electromagnetic radiation.

17. An apparatus comprising:
a fuselage;
a wing, wherein said wing depends from said fuselage;
an intake for receiving air, wherein said intake comprises
  an opening in at least one of said wing and said fuselage;
a sensing system for detecting biological agents, wherein said sensing system comprises a collection media, wherein:
  said collection media comprises a plurality of stationary-phase sample-collecting regions;
  said collection media is fluidically coupled to said intake; and
  said collection media retains a first sample of particulates on a first one of said stationary-phase sample-collecting regions and retains a second sample of particulates on a second one of said stationary-phase sample-collecting regions, wherein said particulates are contained in the air received by said intake;
a GPS receiver for determining location; and
a device for associating location, as determined by said GPS receiver, with at least one of:
  a. said first sample and said second sample; and
  b. said stationary-phase sample-collecting regions,
thereby providing an indication of sampling location.

18. The apparatus of claim 17 further comprising a device for associating at least one of time or a time period with said sample-collecting region that has retained said first sample of particulates and with said sample-collecting region that has retained said second sample of particulates.

* * * * *